US008961663B2

(12) United States Patent
Asano et al.

(10) Patent No.: US 8,961,663 B2
(45) Date of Patent: Feb. 24, 2015

(54) CARBON DIOXIDE RECOVERY APPARATUS AND METHOD

(75) Inventors: Taku Asano, New York, NY (US); Tatsuya Tsujiuchi, New York, NY (US); Richard Reinke, New York, NY (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 28 days.

(21) Appl. No.: 13/605,486

(22) Filed: Sep. 6, 2012

(65) Prior Publication Data

US 2014/0065053 A1 Mar. 6, 2014

(51) Int. Cl.
 *B01D 53/14* (2006.01)
(52) U.S. Cl.
 USPC ........ 96/234; 96/242; 95/42; 95/183; 95/193; 95/209; 95/231; 95/236
(58) Field of Classification Search
 None
 See application file for complete search history.

(56) References Cited

U.S. PATENT DOCUMENTS

| 2010/0218674 A1* | 9/2010 | Fujikawa et al. | 95/42 |
| 2012/0014861 A1* | 1/2012 | Hirata et al. | 423/437.1 |

FOREIGN PATENT DOCUMENTS

| JP | 2010-202426 A | 9/2010 |
| JP | 2010-241630 A | 10/2010 |
| WO | 2010/113364 A1 | 10/2010 |

OTHER PUBLICATIONS

Ariyapadi, S. et al., Study evaluates design of high-capacity CO2 injection plants; Oil Gas Journal, vol. 104, No. 33, pp. 74-75, 78-84, Sep. 4, 2006.
International Search Report dated Nov. 12, 2013 in corresponding to International Patent Application No. PCT/JP2013/073479.

\* cited by examiner

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

An apparatus that separates and recovers $CO_2$ from a $CO_2$ absorbent that has absorbed $CO_2$ includes a regeneration tower configured to apply heat to the $CO_2$ absorbent that has absorbed $CO_2$, configured to separate and remove $CO_2$ from the $CO_2$ absorbent, configured to exhaust $CO_2$ gas, and configured to regenerate the $CO_2$ absorbent, a plurality of compressors configured to compress the $CO_2$ gas exhausted from the regeneration tower, a dehydration device provided between the plurality of compressors and configured to remove moisture from the compressed $CO_2$, and a line configured to supply air or $N_2$ gas into the dehydration device to preliminarily operate the dehydration device until a stable state is achieved before starting the compressor.

3 Claims, 3 Drawing Sheets

CARBON DIOXIDE RECOVERY APPARATUS AND METHOD

BACKGROUND OF THE INVENTION

The present invention relates to an apparatus configured to recover carbon dioxide ($CO_2$) and a method for recovering $CO_2$.

The greenhouse effect due to $CO_2$ has been regarded as one of the causes of global warming. In order to suppress this phenomenon, very much research and development for preventing or suppressing the release of $CO_2$ into the atmosphere have been carried out. Because $CO_2$ is generated mainly by the combustion of fossil fuels, it is desired that exhaust gas generated by the combustion of fossil fuels be emitted to the atmosphere after $CO_2$ contained in the gas is appropriately reduced or removed therefrom.

Each of Japanese Patent Application Publication No. 2010-241630 and Japanese Patent Application Publication No. 2010-202426 discusses a $CO_2$ recovery apparatus which removes $CO_2$ from exhaust gas by absorbing $CO_2$ contained in exhaust gas into a $CO_2$ absorbent. Japanese Patent Application Publication No. 2010-241630 and Japanese Patent Application Publication No. 2010-202426 discuss a plurality of compressors which compresses $CO_2$ gas generated when a $CO_2$ absorbent is regenerated. In addition, Japanese Patent Application Publication No. 2010-241630 and Japanese Patent Application Publication No. 2010-202426 discuss a dehydration tower provided between a plurality of compressors, which removes moisture from $CO_2$ gas.

SUMMARY OF THE INVENTION

The present invention is directed to provide a $CO_2$ recovery apparatus capable of and a $CO_2$ recovery method for preventing the corrosion of a high-pressure side compressor, which corrosion of the high-pressure side compressor being possible when $CO_2$ containing moisture is mixed into the compressor provided downstream of a dehydration device because it takes time to start the dehydration device.

According to an aspect of the present invention, an apparatus that separates and recovers $CO_2$ from a $CO_2$ absorbent that has absorbed $CO_2$ includes a regeneration tower configured to apply heat to the $CO_2$ absorbent that has absorbed $CO_2$, configured to separate and remove $CO_2$ from the $CO_2$ absorbent, configured to exhaust $CO_2$ gas, and configured to regenerate the $CO_2$ absorbent, a plurality of compressors configured to compress the $CO_2$ gas exhausted from the regeneration tower, a dehydration device provided between the plurality of compressors and configured to remove moisture from the compressed $CO_2$, and a line configured to supply air or $N_2$ gas into the dehydration device to preliminarily operate the dehydration device until a stable state is achieved before starting the compressor.

According to an aspect of the present invention, a line can be further provided between the plurality of compressors by bypassing the dehydration device provided between the plurality of compressors.

According to an aspect of the present invention, a line for circulating $CO_2$ until the water concentration or the $O_2$ concentration in the compressed $CO_2$ is decreased to a predetermined concentration can be further included between the plurality of compressors.

According to an aspect of the present invention, a deoxidization device configured to remove $O_2$, which is contained in air to be supplied into the dehydration device, can be included.

According to an aspect of the present invention, an $O_2$ concentration meter configured to measure the concentration of $O_2$ in the compressed $CO_2$ can be included.

According to another aspect of the present invention, a method for separating and recovering $CO_2$ from a $CO_2$ absorbent that has absorbed $CO_2$ includes a step for regenerating the $CO_2$ absorbent by applying heat to the $CO_2$ absorbent that has absorbed $CO_2$ to separate and remove $CO_2$ from the $CO_2$ absorbent, a step for executing a preliminary operation of a dehydration device until a stable state is achieved by supplying air or $N_2$ gas to the dehydration device, which is provided between a plurality of compressors configured to compress $CO_2$ gas generated by the regeneration of the $CO_2$ absorbent, a step for executing a preliminary operation of the plurality of compressors until a stable state is achieved by supplying $CO_2$ gas to a line that communicates the plurality of compressors together and to the plurality of compressors by bypassing the dehydration device, and a step for compressing the $CO_2$ gas by discontinuing supplying the air or the $N_2$ gas, discontinuing bypassing the $CO_2$ gas, and supplying the $CO_2$ gas to the plurality of compressors and the dehydration device after the stationary state of each of the dehydration device and the plurality of compressors is achieved.

According to another aspect of the present invention, the step for preliminarily operating the dehydration device can further include heating the absorbent in the dehydration device.

According to another aspect of the present invention, in the step for compressing $CO_2$ gas, a circulation operation can be executed by supplying the $CO_2$ gas, which has been compressed by each of the plurality of compressors provided across the dehydration device, until the concentration of water or the concentration of $O_2$ in the compressed $CO_2$ is decreased to a predetermined concentration.

According to another aspect of the present invention, in the step for compressing $CO_2$ gas, the concentration of oxygen contained in $CO_2$ compressed by the plurality of compressors can be measured.

According to another aspect of the present invention, in the step for preliminarily operating the dehydration device, air can be supplied to the dehydration device and $O_2$ contained in the air supplied to the dehydration device can be removed by using an $O_2$ removal catalyst.

DESCRIPTION OF THE PREFERRED EMBODIMENTS

Hereinbelow, a preferred embodiment of the present invention, which is an apparatus configured to recover $CO_2$ and a $CO_2$ recovery method, will be described with reference to the attached drawings.

Figure 1:
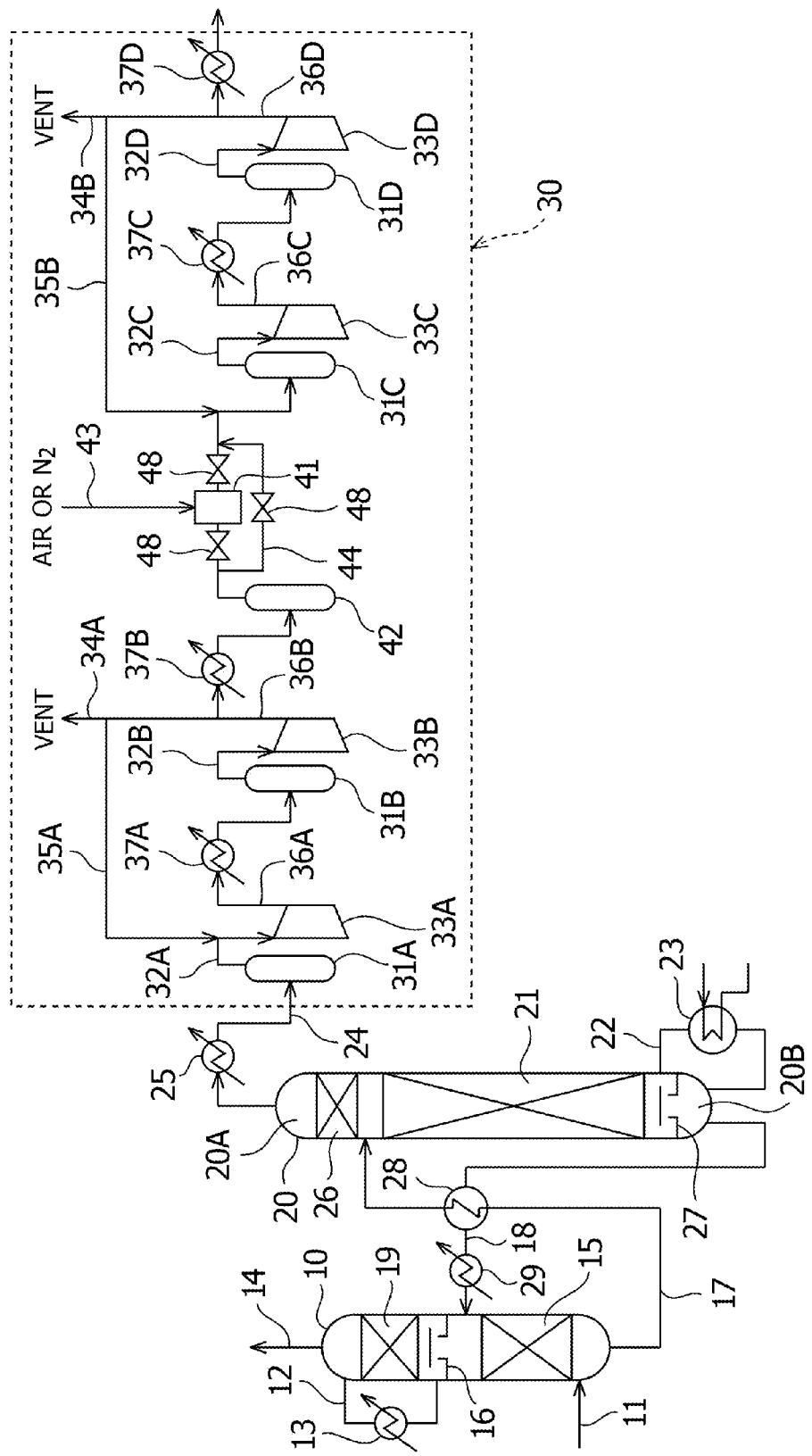
FIG. 1 is a diagram schematically illustrating a $CO_2$ recovery apparatus according to a preferred embodiment of the present invention.

Referring to FIG. 1, a $CO_2$ recovery apparatus according to the present preferred embodiment includes, as main components thereof, an absorption tower 10, which is configured to remove $CO_2$ from gas to be processed by using a $CO_2$ absorbent, a regeneration tower 20, which is configured to regenerate the $CO_2$ absorbent by desorbing $CO_2$ from the $CO_2$ absorbent which has absorbed $CO_2$ (hereinafter referred to as a "rich absorbent") (the regenerated $CO_2$ absorbent will hereafter be referred to as a "lean absorbent"), and a $CO_2$ gas compression system 30, which is configured to compress $CO_2$ gas generated in the regeneration tower 20. Note that, although it is not illustrated in FIG. 1, the $CO_2$ recovery apparatus according to the present preferred embodiment can include a desulfurization device provided upstream of the absorption tower 10 and which is configured to remove sulfur oxides from gas to be processed, in particular, a high desulfurization cooling tower including a high desulfurization unit and a desulfurized gas cooling unit.

The absorption tower 10 includes a $CO_2$ absorption unit 15 in a lower portion of the absorption tower 10 and a cleaning unit 19 in an upper portion of the absorption tower 10, which are provided across a chimney tray 16 provided in the center portion of the absorption tower 10. In addition, the absorption tower 10 includes a gas introduction line 11, which is provided below the $CO_2$ absorption unit 15 to introduce gas to be processed into the absorption tower 10, a lean absorbent line 18, which is provided below the $CO_2$ absorption unit 15 to supply a $CO_2$ absorbent to the $CO_2$ absorption unit 15, and a rich absorbent line 17, which is provided in the bottom portion of the absorption tower 10 to discharge the rich absorbent which has absorbed $CO_2$. Furthermore, the absorption tower 10 includes a cleaning fluid circulation line 12, which connects an upper portion of a cleaning unit 19 with a lower portion thereof to circulatively supply the cleaning fluid accumulated on the chimney tray 16 to the cleaning unit 19, a cooler 13, which is provided on the cleaning fluid circulation line 12 to cool the cleaning fluid, and a gas exhaust line 14, which is provided on the top portion of the absorption tower 10 to exhaust gas that has passed through the $CO_2$ absorption unit 15 and the cleaning unit 19 outside the absorption tower 10.

The $CO_2$ absorbent is not limited to a specific type absorbent. However, it is useful to use a $CO_2$ absorbent containing a basic amine compound as a main component thereof. The basic amine compound includes, for example, top-grade amines containing alcoholic hydroxyl, such as monoethanolamine or 2-amino-2-methine-1-propanol, second-grade amines containing alcoholic hydroxyl, such as diethanolamine, 2-methyl aminoethanol, or 2-ethylamino ethanol, third-grade amines containing alcoholic hydroxyl, such as triethanolamine, N-methyldiethanolamine, 2-dimethyl aminoethanol, or 2-diethylaminoethanol, polyethylene polyamines, such as ethylenediamine, triethylenediamine, or diethylenetriamine, cyclic amines, such as piperazines, piperidines, or pyrrolidines, polyamines, such as xylylenediamine, or aminoacids, such as methylamine carboxylic acid. The $CO_2$ absorbent can contain one or more of the compounds described above. The concentration of the basic amine compound can be 10-70% by weight. The $CO_2$ absorbent can contain a $CO_2$ absorption accelerator and a corrosion inhibitor. In addition, the $CO_2$ absorbent can include a medium other than those described above, such as methanol, polyethylene glycol, or sulfolane.

The regeneration tower 20 includes a $CO_2$ desorption unit 21, which is provided in a portion of the regeneration tower 20 from the center to a lower portion thereof. In addition, the regeneration tower 20 includes a washing unit 26, which is provided above the $CO_2$ desorption unit 21, and a chimney tray 27, which is provided below the $CO_2$ desorption unit 21. In the regeneration tower 20, the rich absorbent line 17 for introducing the rich absorbent that has absorbed $CO_2$ in the absorption tower 10 into the regeneration tower 20 is provided between the $CO_2$ desorption unit 21 and the washing unit 26. In addition, in the regeneration tower 20, the lean absorbent line 18 for supplying the regeneration-processed lean absorbent to the absorption tower 10 is provided in the bottom portion of the regeneration tower 20. Furthermore, in the regeneration tower 20, a heat exchanger 28, which exchanges heat between the rich absorbent line 17 and the lean absorbent line 18, is provided. In addition, a heat exchanger 29, which further recovers heat from the lean absorbent, is provided between the heat exchanger 28 and the absorption tower 10.

The regeneration tower 20 includes an absorbent regeneration line 22 for extracting a part of the lean absorbent from the bottom portion of the regeneration tower 20 and for supplying the extracted lean absorbent to the chimney tray 27 from above. The absorbent regeneration line 22 includes a reboiler 23, which heats the lean absorbent. In addition, the regeneration tower 20 includes a $CO_2$ gas exhaust line 24 for exhausting $CO_2$ gas which has been desorbed from the lean absorbent from the top portion of the regeneration tower 20. The $CO_2$ gas exhaustion line 24 includes a condenser 25 which condenses steam entrained in the $CO_2$ gas and a separator drum 31A which separates condensed water, which results from the condensation by the condenser 25, from the gas. The condenser 25 can use cooling water to cool the gas. A condensed water return line (not illustrated), which is a line for supplying the separated condensed water as washing water for the washing unit 26 of the regeneration tower 20, is provided to the separator drum 31A. A pump (not illustrated) for feeding the condensed water to the regeneration tower 20 is provided to the condensed water return line.

The $CO_2$ gas compression system 30 includes a plurality of compressors 33 as a main component thereof. The plurality of compressors 33 is serially provided and is configured to compress the $CO_2$ gas exhausted from the regeneration tower 20. In FIG. 1, four compressors 33A through 33D are illustrated. However, in the present preferred embodiment, the number of the compressors 33 is not limited to four. More specifically, the compressors 33 can be provided in the appropriate number with which $CO_2$ gas can be serially compressed in raising the pressure applied to the compressed $CO_2$ gas to a predetermined pressure level (for example, a critical point of 7.4 MPa). For example, if compressed $CO_2$ gas is to be injected from the ground of an oilfield and stored therein, it is useful if the number of the compressors 33 to be provided is three. It is more useful, in this case, if the number of the compressors 33 to be provided is four or more. More specifically, it is useful if the number of the compressors 33 is eight or fewer.

To each of the compressors 33, a separator drum 31 which separates the condensed water from the $CO_2$ gas, a gas line 32 for feeding the $CO_2$ gas from which condensed water has been separated to the compressor 33, a compressed $CO_2$ gas compression line 36 for supplying the compressed $CO_2$ gas, which has been compressed by the compressor 33, to a subsequent compressor, and a compressor 37 which condenses steam entrained in the compressed $CO_2$ gas are provided. In addition, at each of an outlet of a low-pressure side compressor 33B and an outlet of a high-pressure side compressor 33D, a ventilation line 34 for exhausting a part of $CO_2$ gas having a high water concentration or a high $O_2$ concentration is provided. A $CO_2$ gas circulation line 35 for circulating $CO_2$ gas is provided to each of a portion of the $CO_2$ gas compression system 30 from the outlet of the low-pressure side compressor 33B to an inlet of the low-pressure side compressor 33A and a portion of the $CO_2$ gas compression system 30 from the outlet of the high-pressure side compressor 33D to an inlet of the high-pressure side compressor 33C. Although not illustrated in FIG. 1, a condensed water return line for returning the condensed water to the regeneration tower 20 is provided to each of the second-through the fourth-stage separator drums 31 (i.e., separator drums 31B through 31D) as is provided to the separator drum 31A.

The $CO_2$ gas compression system 30 further includes a dehydration device 41, which is capable of removing moisture from the compressed $CO_2$ gas by an amount greater than a saturating amount. The dehydration device 41 is provided with a gas supply line 43 for introducing air or $N_2$ gas into the dehydration device 41 and a bypass line 44 for preventing the introduction of $CO_2$ gas into the dehydration device 41. The dehydration device 41 is not limited to a particular type device and any dehydration device capable of reducing the humidity of gas can be used. For example, it is useful if a dehydration device of a type that uses a glycol absorbent is used. For the absorbent described above, monoethylene glycol, diethylene glycol, or triethylene glycol, for example, can be used. A separator drum 42 can be provided upstream of the dehydration device 41. The dehydration device 41 can perform at a sufficiently high level by previously removing the moisture from the gas as large an amount as the saturating amount by using the separator drum 42. Note that it is useful if the dehydration device 41 is provided and positioned in the center of the location where the plurality of compressors 33 is provided. For example, in the example illustrated in FIG. 1, the dehydration device 41 is provided between the second-stage compressor 33B and the third-stage compressor 33C. However, the present invention is not limited to this. Note, in addition, that the two compressors 33 provided upstream of the dehydration device 41 are herein referred to as the low-pressure side compressor 33A and the low-pressure side compressor 33B and the other two compressors 33 provided downstream of the dehydration device 41 are herein referred to as the high-pressure side compressor 33C and the high-pressure side compressor 33D. The gas to be introduced into the dehydration device 41 is not limited to a particular type. However, it is useful if compressed air or $N_2$ gas is used. For example, to consider the consumption of the gas to be introduced, inner-plant instrumentation compressed air can be used.

With the above-described configuration, as illustrated in FIG. 1, gas to be processed containing $CO_2$ is introduced to the absorption tower 10 via the gas introduction line 11. In addition, $CO_2$ absorbent is supplied to the absorption tower 10 via the lean absorbent line 18. In the $CO_2$ absorption unit 15, the gas to be processed and the $CO_2$ absorbent are brought into gas-liquid contact with each other to allow the $CO_2$ absorbent to absorb $CO_2$ contained in the gas to be processed to remove $CO_2$ therefrom. The gas, from which $CO_2$ has been removed, flows above the chimney tray 16 to reach the cleaning unit 19, which is provided in the upper portion of the absorption tower 10. The gas is then cleaned by using the cleaning fluid. Subsequently, the cleaned gas is exhausted from the gas exhaustion line 14, which is provided in the top portion of the absorption tower 10. The cleaning fluid used by the cleaning unit 19 is accumulated on the chimney tray 16 and does not fall into the $CO_2$ absorption unit 15. The cleaning fluid accumulated on the chimney tray 16 is fed to the cooler 13 via the cleaning fluid circulation line 12 to be cooled by the cooler 13. After that, the cooled cleaning fluid is reused by the cleaning unit 19 as the cleaning fluid.

The rich absorbent, which has absorbed $CO_2$ in the absorption tower 10, is exhausted from the bottom portion of the absorption tower 10 via the rich absorbent line 17. Subsequently, the exhausted rich absorbent is heated by the heat exchanger 28 to be fed to the regeneration tower 20. In the regeneration tower 20, the rich absorbent is diffused onto the $CO_2$ desorption unit 21 from a plurality of nozzles provided on a tip of the rich absorbent line 17. Steam is supplied into the regeneration tower 20 from below the $CO_2$ desorption unit 21. In the $CO_2$ desorption unit 21, the rich absorbent and the steam are brought into gas-liquid contact with each other and most of $CO_2$ contained in the rich absorbent is discharged from the rich absorbent due to endothermic reaction. After a part or most part of $CO_2$ is discharged from the $CO_2$ absorbent (hereinafter referred to as a "semi-lean solution"), the semi-lean solution is regenerated into $CO_2$ absorbent from which $CO_2$ has been substantially completely removed (hereinafter referred to as a "lean solution") when the semi-lean solution reaches the bottom portion of the absorbent regeneration tower 20.

The absorbent accumulated onto the chimney tray 27 is fed from an inlet of the absorbent regeneration line 22 to be heated by the reboiler 23 with steam. Subsequently, residual $CO_2$ is discharged from the absorbent to regenerate the absorbent. Then the regenerated absorbent is returned to a tower bottom 20B of the regeneration tower 20 from an outlet of the absorbent regeneration line 22. The regenerated lean absorbent is fed to the heat exchanger 28 from the tower bottom 20B via the lean absorbent line 18. The heat exchanger 28 heats the rich absorbent. Subsequently, the heat exchanger 29 further recovers the heat from the absorbent. Then the absorbent is supplied to the absorption tower 10.

The $CO_2$ gas desorbed from the rich absorbent is fed through the chimney tray 27 and the $CO_2$ desorption unit 21 and is raised up to the washing unit 26. In the washing unit 26, the washing water is diffused from a plurality of nozzles provided on a tip of the condensed water return line to remove the entrained absorbent from the $CO_2$ gas. After being washed by the washing unit 26, $CO_2$ gas is exhausted from the $CO_2$ gas exhaustion line 24, which is provided on a tower top 20A of the regeneration tower 20.

In the $CO_2$ gas exhaustion line 24, steam entrained in the $CO_2$ gas is condensed by the condenser 25. Furthermore, the condensed water is separated by the separator drum 31A. After being separated, the condensed water is returned to the regeneration tower 20 via the condensed water return line (not illustrated). After the condensed water is removed from the $CO_2$ gas, the $CO_2$ gas is introduced into the first-stage compressor 33A via a $CO_2$ gas line 32A. In the compressor 33A, the temperature of the $CO_2$ gas is raised to a high level when the $CO_2$ gas is compressed to a predetermined pressure. After the $CO_2$ gas is compressed by the compressor 33A, the compressed $CO_2$ gas is fed to the second-stage compressor 33B via a compressed $CO_2$ gas compression line 36A to be further compressed.

In the compressed $CO_2$ gas compression line 36A, similar to the processing by the first-stage compressor 33A, the steam entrained in the compressed $CO_2$ gas is condensed by a condenser 37A. Then the condensed water is separated by the separator drum 31B. Subsequently, the $CO_2$ gas is introduced into the second-stage compressor 33B via a $CO_2$ gas line 32B. The second-stage compressor 33B compresses the $CO_2$ gas to a predetermined pressure and the temperature of the gas is raised. Subsequently, the further-compressed $CO_2$ gas is fed into the third-stage compressor 33C via a compressed $CO_2$ gas compression line 36B to be yet further compressed.

Note that before the compressed $CO_2$ gas is compressed by the third-stage compressor 33C, entraining steam is condensed and removed by a condenser 37B and the separator (dehydration) drum 42 before the compressed $CO_2$ gas is introduced to the dehydration device 41. In the dehydration device 41, the moisture in the compressed $CO_2$ gas can be absorbed by the absorbent to be removed therefrom by bringing the compressed $CO_2$ gas into gas-liquid contact with a glycol absorbent. After the compressed $CO_2$ gas is dehydrated by the dehydration device 41, the entraining moisture and glycol are condensed and separated by the separator drum 31C. Subsequently, the compressed $CO_2$ gas is introduced into the high-pressure side compressor 33C. In the third-stage compressor 33C, the compressed $CO_2$ gas is compressed with a pressure as high as a predetermined pressure and the temperature of the gas is raised. Subsequently, the compressed $CO_2$ gas is fed into the fourth-stage compressor 33D via a compressed $CO_2$ gas compression line 36C. In the fourth-stage compressor 33D, in the manner similar to the processing described above, after moisture and glycol are condensed and removed from the compressed $CO_2$ gas, the compressed $CO_2$ gas is further compressed with a pressure as high as a final predetermined pressure. The compressed $CO_2$ gas compressed with the final predetermined pressure is recovered to be used for a predetermined purpose.

A preliminary operation of the $CO_2$ gas compression system 30 will be described in more detail below. At the start of the preliminary operation, air or $N_2$ gas is supplied to the dehydration device 41 only via the gas supply line 43 to apply pressure to the $CO_2$ gas compression system 30. After the pressure is applied to the $CO_2$ gas compression system 30, the dehydration device 41 is started. Subsequently, the absorbent in the dehydration device 41 is heated to raise the temperature of the absorbent up to a predetermined temperature to reach a stationary state. The "stationary state" refers to a state in which the temperature of the absorbent has reached the predetermined temperature. The operation described above can be started in parallel to and at the same timing as the startup of the $CO_2$ recovery apparatus (the absorption tower 10, the regeneration tower 20, and the like). Subsequently, the low-pressure side compressors 33A and 33B and the high-pressure side compressors 33C and 33D are started at the same timing. The $CO_2$ gas bypasses the dehydration device 41 via the bypass line 44 until the operation state of the compressors 33A through 33D becomes stabilized. During a period of the operation described above, $CO_2$ containing moisture flows into the high-pressure side compressors 33C and 33D. However, the problem of corrosion of the high-pressure side compressors 33C and 33D may not arise because the startup time for the compressor is short. After the operation state becomes stabilized, a valve 48 is switched from the bypass line 44 to the dehydration device 41 to introduce the $CO_2$ gas into the dehydration device 41 and start the dehydration. A $CO_2$ gas circulation operation is executed by using the $CO_2$ gas circulation line 35 until the water concentration of the $CO_2$ gas is reduced to a predetermined concentration (for example, 500-700 ppm or lower) and a part of the $CO_2$ gas whose water concentration is high is exhausted into a safe place by using the ventilation line 34. After the water concentration of the $CO_2$ gas becomes the predetermined concentration or lower, the further-compressed $CO_2$ is transported into a pipeline to be recovered.

Now, hereinbelow, in order to prevent the threat of $O_2$ being contained in air mixed into and included in compressed $CO_2$ in applying pressure to the dehydration device 41 by introducing air to the dehydration device 41, an exemplary embodiment for removing the $O_2$ will be described with reference to FIGS. 2 and 3.

Figure 2:
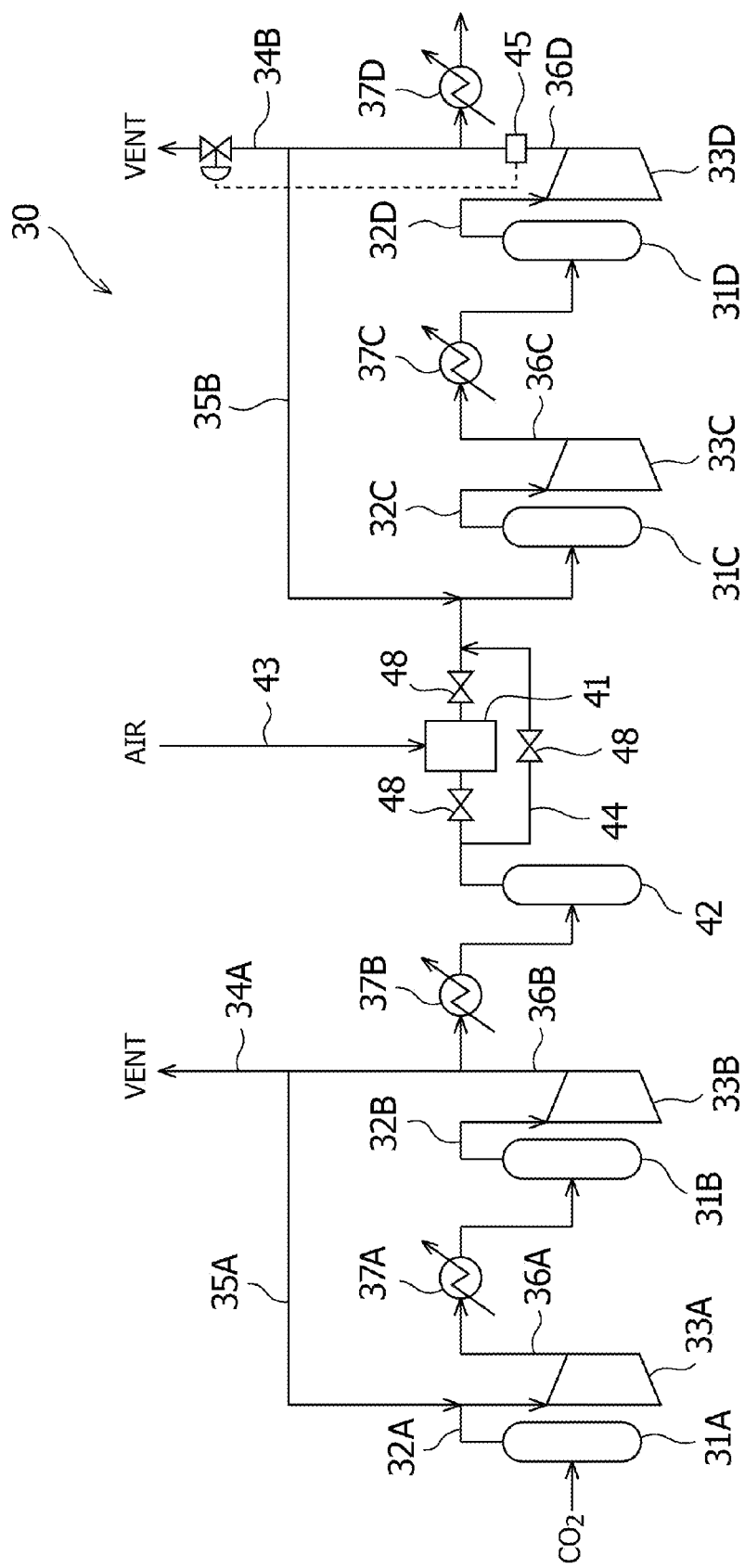
FIG. 2 is a cross section schematically illustrating an example of a $CO_2$ gas compression system illustrated in FIG. 1.

In an example illustrated in FIG. 2, an $O_2$ concentration meter 45 is provided at the outlet of the high-pressure side compressor 33D. The location for installing the $O_2$ concentration meter 45 is not limited to a particular location and the $O_2$ concentration meter 45 can be provided at any location downstream of the dehydration device 41.

The preliminary operation of the $CO_2$ gas compression system 30 illustrated in FIG. 2 will be described in detail below. At the start of the preliminary operation, air is supplied to the dehydration device 41 only via the gas supply line 43 to apply pressure inside the $CO_2$ gas compression system 30. After the pressure is applied, the dehydration device 41 is started. Subsequently, the absorbent in the dehydration device 41 is heated up to a predetermined temperature to reach a stable state. The operation described above can be started in parallel to and at the same timing as the startup of the $CO_2$ recovery apparatus (the absorption tower 10, the regeneration tower 20, and the like). Subsequently, the low-pressure side compressors 33A and 33B and the high-pressure side compressors 33C and 33D are started at the same timing. The $CO_2$ gas bypasses the dehydration device 41 via the bypass line 44 until the operation state of the compressors 33A through 33D becomes stabilized. During a period of the operation described above, $CO_2$ containing moisture flows into the high-pressure side compressors 33C and 33D. However, the problem of corrosion of the high-pressure side compressors 33C and 33D may not arise because the startup time for the compressor is short. After the operation state becomes stabilized, the valve 48 is switched from the bypass line 44 to the dehydration device 41 to introduce the $CO_2$ gas into the dehydration device 41 and start the dehydration. A $CO_2$ gas circulation operation is executed by using the $CO_2$ gas circulation line 35 until the $O_2$ concentration of the $CO_2$ gas is reduced to a predetermined concentration (for example, 10-100 ppm or lower) and a part of the $CO_2$ gas whose $O_2$ concentration is high is exhausted into a safe place by using the ventilation line 34. After the water concentration and the $O_2$ concentration of the $CO_2$ gas become the predetermined concentration or lower, the further-compressed $CO_2$ gas is transported into a pipeline to be recovered.

Figure 3:
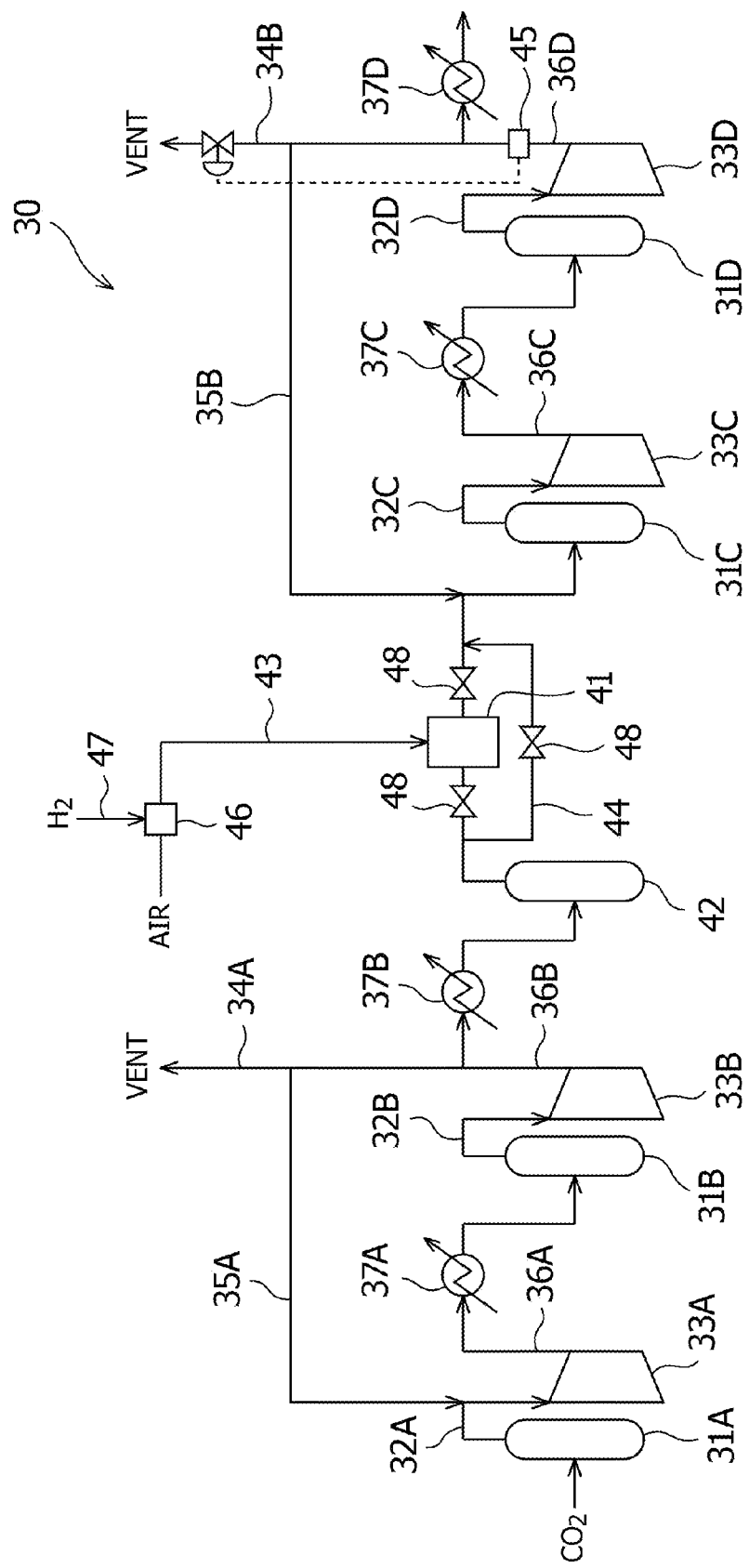
FIG. 3 is a cross section schematically illustrating another example of the $CO_2$ gas compression system illustrated in FIG. 1.

Referring to FIG. 3, a deoxidization device 46 is provided to the gas supply line 43 of the dehydration device 41. Inside the deoxidization device 46, a ballistic modifier (not illustrated) for removing oxygen contained in air by combustion and an $H_2$ gas supply line 47 for supplying $H_2$ gas into the deoxidization device 46 are provided. A cooler (not illustrated) for removing generated drain and a drain separator (not illustrated) are provided downstream of the deoxidization device 46. In addition, similar to the example illustrated in FIG. 2, the $O_2$ concentration meter 45 is provided at the outlet of the high-pressure side compressor 33D. The location for installing the $O_2$ concentration meter 45 is not limited to a particular location and the $O_2$ concentration meter 45 can be provided at any location downstream of the dehydration device 41.

In executing the preliminary operation of the $CO_2$ gas compression system 30 illustrated in FIG. 3, the $O_2$ contained in air supplied into the deoxidization device 46 can be removed by using the ballistic modifier (not illustrated) by using $H_2$ gas as flammable gas. Subsequently, the air from which the $O_2$ has been removed is supplied to the dehydration device 41 only via the gas supply line 43. After the above-described operation, the preliminary operation of the $CO_2$ gas compression system 30 illustrated in FIG. 2 can be executed in a similar manner as described above.

By executing the above-described operations, the startup time taken in a case of a normal startup method, by which a dehydration device is started at the same time as a compressor is started, can be shortened. Therefore, the mixture of $CO_2$ containing moisture into the dehydration device can be suppressed and corrosion of the high-pressure side compressors can be prevented. As described above, according to the $CO_2$ recovery apparatus and the $CO_2$ recovery method of the present invention, the purity of $CO_2$ to be recovered can be improved.

Although not illustrated in the drawings, a high desulfurization cooling tower configured to remove sulfur oxides contained in gas to be processed, which can be provided upstream of the gas to be processed by the absorption tower 10, will be described below. The high desulfurization cooling tower includes a high desulfurization unit, which is provided in a lower portion of the high desulfurization cooling tower and configured to remove sulfur oxides to a high degree contained in gas to be processed. In addition, the high desulfurization cooling tower includes a desulfurized gas cooling unit, which is provided in an upper portion of the high desulfurization cooling tower and configured to cool the desulfurized gas that has passed the high desulfurization unit down to 50° C., for example. The gas that has passed the desulfurized gas cooling unit is then introduced into the absorption tower 10. Exhaust gas usually contains sulfur oxides and carbon dioxide. The high desulfurization unit executes high desulfurization processing to reduce the concentration of the sulfur oxides down to 5 ppm or lower (it is more useful if the concentration of the sulfur oxides is reduced to 1 ppm or lower) by absorbing and removing sulfur oxides contained in exhaust gas by bringing the exhaust gas into contact with a basic absorbent. If the concentration of sulfur oxides contained in the gas exceeds 5 ppm, the sulfur oxides may be accumulated into the $CO_2$ absorbent used in the absorption tower. In this case, a problem of the increased frequency of reclaiming the $CO_2$ absorbent may arise. To prevent the above-described problem, the high desulfurization unit executes the high desulfurization processing.

For the basic absorbent, an absorbent that contains one basic compound or a mixture of two or more compounds of calcium carbonate, calcium hydroxide, magnesium hydroxide, sodium hydroxide, and the like can be used, for example. It is useful, for example, if the concentration of the basic compound is 0.1 to 30% by weight.

The desulfurized gas cooling unit cools the gas processed by the high desulfurization unit down to 50° C. or lower, more usefully to 45° C. or lower, and yet more usefully to a range of 30-45° C. The desulfurized gas cooling unit cools the highly desulfurization—processed gas because otherwise a problem of wasteful consumption of the basic amine compound may arise due to an increase, in the absorption tower 10 which is a tower subsequent to the high desulfurization cooling tower, of the amount of the basic amine compound, which is the main component of the $CO_2$ absorbent entrained in the gas. As described above, by installing the high desulfurization cooling tower upstream of the gas to be processed by the absorption tower 10 of the present invention, the absorption tower 10 can easily remove and recover $CO_2$ contained in the gas at low costs.

A preferred embodiment of the present invention are as described above. However, it is not intended to limit the scope of the present invention to a specific preferred embodiment described above. In addition, it is intended that various modifications, alterations, or equivalent replacements can be used in the present invention without any deviation from the spirit and the scope of the present invention as claimed in the claims attached hereto.

What is claimed is:

1. An apparatus for separating and recovering $CO_2$ from a $CO_2$ absorbent that has absorbed $CO_2$, the apparatus comprising:
    a regeneration tower configured to apply heat to the $CO_2$ absorbent that has absorbed $CO_2$, configured to separate and remove $CO_2$ from the $CO_2$ absorbent, configured to exhaust $CO_2$ gas, and configured to regenerate the $CO_2$ absorbent;
    a plurality of compressors configured to compress the $CO_2$ gas exhausted from the regeneration tower;
    a dehydration device provided between the plurality of compressors and configured to remove moisture from the compressed $CO_2$;
    a $CO_2$ gas line connecting the regeneration tower, the plurality of compressors and the dehydration device;
    an air or $N_2$ gas line configured to supply air or $N_2$ gas into the dehydration device to preliminarily operate the dehydration device until a stable state is achieved before starting the compressor, the air or $N_2$ gas line being separate from the $CO_2$ gas line;
    a bypass line which is provided between the plurality of compressors and bypasses the dehydration device provided between the plurality of compressors, the bypass line being separate from the $CO_2$ gas line; and
    a circulation line which is provided between the plurality of compressors and configured to circulate $CO_2$ until a concentration of water or a concentration of $O_2$ in the compressed $CO_2$ is decreased to a predetermined concentration, the circulation line being separate from the $CO_2$ gas line.

2. The apparatus according to claim 1, further comprising a deoxidization device configured to remove $O_2$ from air to be supplied to the dehydration device.

3. The apparatus according to claim 1, further comprising an $O_2$ concentration meter configured to measure the concentration of $O_2$ in the compressed $CO_2$.

* * * * *